(12) United States Patent
Xiang et al.

(10) Patent No.: US 10,549,215 B2
(45) Date of Patent: Feb. 4, 2020

(54) BUBBLE REMOVING SYSTEM (71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Chen Xiang, Beijing (CN); Libo Chen, Beijing (CN); Liwei Fan, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 277 days.

(21) Appl. No.: 15/516,248

(22) PCT Filed: Feb. 18, 2016

(86) PCT No.: PCT/CN2016/073986
§ 371 (c)(1),
(2) Date: Mar. 31, 2017

(87) PCT Pub. No.: WO2017/045354
PCT Pub. Date: Mar. 23, 2017

(65) Prior Publication Data
US 2017/0304747 A1 Oct. 26, 2017

(30) Foreign Application Priority Data
Sep. 15, 2015 (CN) .......................... 2015 1 0587690

(51) Int. Cl.
*B01D 19/00* (2006.01)
*C02F 1/20* (2006.01)

(52) U.S. Cl.
CPC ...... *B01D 19/0078* (2013.01); *B01D 19/0031* (2013.01); *B01D 19/0052* (2013.01); *C02F 1/20* (2013.01); *B01L 2300/08* (2013.01)

(58) Field of Classification Search
CPC  B01D 19/00; B01D 19/0031; B01D 19/0052; B01D 19/0078; B01L 2300/08;
(Continued)

(56) References Cited

U.S. PATENT DOCUMENTS 2,564,765 A * 8/1951 Mercier ................. B01D 19/02
239/214.25
2,765,871 A * 10/1956 Mair ...................... B01D 1/305
55/355

(Continued)

FOREIGN PATENT DOCUMENTS

CN       2342863 Y    10/1999
CN     101918099 A    12/2010
(Continued)

OTHER PUBLICATIONS

International Search Report and Written Opinion dated Jun. 13, 2016; PCT/CN2016/073986.
(Continued)

*Primary Examiner* — Cabrena Holecek
(74) *Attorney, Agent, or Firm* — Iadas (57) ABSTRACT

A bubble removing system and a bubble removing method are provided. The bubble removing system comprises a main bubble removing apparatus which comprises a first enclosed container, a first fluid lead-in pipe, a first fluid lead-out pipe, and a bubble collecting member. The cross section of the inner cavity of the first enclosed container is circular, and the first enclosed container is used for accommodating a fluid substance. The first fluid lead-in pipe passes through a sidewall of the first enclosed container, is tangent to the
(Continued)

inner cavity wall of the first enclosed container, and is disposed at the upper part of the first enclosed container. The first fluid lead-out pipe passes through the sidewall of the first enclosed container and is disposed at the lower part of the first enclosed container.

19 Claims, 5 Drawing Sheets

(58) Field of Classification Search
CPC ...... C02F 1/20; C02F 1/36; C02F 1/44; C02F 2301/063
See application file for complete search history.

(56) References Cited

U.S. PATENT DOCUMENTS

| | | | | |
|---|---|---|---|---|
| 5,209,765 A | * | 5/1993 | Kolpak | B01D 19/0052 210/512.2 |
| 2011/0092875 A1 | | 4/2011 | Beck | |
| 2016/0038854 A1 | | 2/2016 | Yang et al. | |

FOREIGN PATENT DOCUMENTS

| | | |
|---|---|---|
| CN | 202087088 U | 12/2011 |
| CN | 103071318 A | 5/2013 |
| CN | 203315801 U | 12/2013 |
| CN | 102014985 B | 3/2014 |
| CN | 204582591 U | 8/2015 |
| CN | 105251241 A | 1/2016 |
| JP | 647915 A | 1/1989 |
| JP | 1177003 A | 3/1999 |
| JP | 11119406 A | 4/1999 |
| JP | 2006-299933 A | 11/2006 |
| WO | 2009/077037 A1 | 6/2009 |

OTHER PUBLICATIONS

First Chinese Office Action dated Sep. 19, 2016; Appln, No. 201510587690.X.
Second Chinese Office Action dated Mar. 30, 2017; Appln. No. 201510587690.X.

* cited by examiner

BUBBLE REMOVING SYSTEM

TECHNICAL FIELD

Embodiments of the present disclosure relate to treatment for a fluid substance, in particular, to a bubble removing system.

BACKGROUND

In industrial production, colloidal substances are used frequently. Because the colloidal substances are great in density and poor in fluidity, bubbles difficult to remove can be easily generated in the colloidal substances, and these bubbles cause bad influences on subsequent production.

For example, in a TFT-LCD manufacturing industry, if photoresist used for coating a colored thin film contains bubbles, then many problems happen to the colored thin film produced through the photoresist containing the bubbles in aspects of thickness, uniformity, optical density and the like, and therefore quality of a product is reduced, and a defect rate of the product is increased.

There are several bubble removing devices and methods in current industrial production, one is to remove bubbles according to a principle that the bubbles naturally float upwards in liquid, and the other is to remove bubbles according to a semipermeable membrane principle. But efficiency for removing bubbles in colloidal substances by these methods is low.

Thus, how to efficiently remove the bubbles in the colloidal substances becomes a technical problem urgently needing to be solved in the field.

SUMMARY

The present disclosure aims at providing a bubble removing system, and the bubble removing system including a bubble removing device can effectively remove bubbles in a fluid substance (a colloidal substance).

In order to achieve a purpose of the present disclosure, a bubble removing system is provided, wherein, the bubble removing system includes a main bubble removing device, and the main bubble removing device includes a first closed container, a first fluid lead-in pipe, a first fluid lead-out pipe and a bubble collecting member;

an inner cavity cross section of the first closed container is round, and the first closed container is configured for containing a fluid substance; the first fluid lead-in pipe passes through a side wall of the first closed container, is tangent with an inner cavity wall of the first closed container, and is arranged on an upper portion of the first closed container; the first fluid lead-out pipe passes through the side wall of the first closed container and is arranged on a lower portion of the first closed container; the bubble collecting member includes a hollow bubble collecting part and a communication part, the bubble collecting part is arranged in a center of a top of an inner cavity of the first closed container, so as to collect the fluid substance located on the top of the first closed container and rich in bubbles, the communication part is arranged outside the first closed container, and the communication part communicates with a hollow portion of the bubble collecting part.

Preferably, the first fluid lead-out pipe is tangent with the inner cavity wall of the first closed container.

Preferably, the first fluid lead-out pipe and the first fluid lead-in pipe are respectively located on two sides of the first closed container in a radial direction, and a protruding direction of the first fluid lead-in pipe is consistent with a protruding direction of the first fluid lead-out pipe.

Preferably, the bubble collecting part includes a base plate and a plurality of bubble collecting blades arranged on a lower surface of the base plate, a surface of the bubble collecting blade is a curved surface, a through hole is formed in the base plate, the plurality of bubble collecting blades is arranged around the through hole, protruding directions of any two adjacent bubble collecting blades are consistent, and the communication part is fixed to an upper surface of the base plate and communicates with the through hole.

Preferably, the communication part includes an upper communicating pipe and a lower communicating shell, a lower end of the lower communicating shell is fixed to the base plate and covers the through hole, an upper end of the lower communicating shell is connected with the upper communicating pipe, and a cross section of the lower communicating shell gradually decreases from bottom to top.

Preferably, the bubble removing system further comprises a bubble pre-removing device, the bubble pre-removing device includes a helical polymer film pipe, an inlet of the helical polymer film pipe is located above an outlet of the helical polymer film pipe, the outlet of the helical polymer film pipe communicates with the first fluid lead-in pipe, and a side wall of the helical polymer film pipe allows gas to penetrate but does not allow the fluid substance to penetrate.

Preferably, the fluid substance is a colloidal substance.

Preferably, the fluid substance is photoresist.

Preferably, the helical polymer film pipe is provided to surround the first closed container.

Preferably, the first fluid lead-in pipe is located above the outlet of the helical polymer film pipe, the bubble removing system further comprises a first connection pipe, and the outlet of the helical polymer film pipe communicates with the first fluid lead-in pipe through the first connection pipe.

Preferably, a cross section of the helical polymer film pipe is rectangular.

Preferably, the bubble removing system further comprises a second closed container and a second fluid lead-in pipe, the helical polymer film pipe is arranged in the second closed container, the second fluid lead-in pipe passes through a top wall of the second closed container and communicates with the inlet of the helical polymer film pipe.

Preferably, the bubble removing system further comprises a vacuumizing mechanism, and the vacuumizing mechanism is configured for vacuumizing the second closed container.

Preferably, the bubble removing system further comprises a guiding pipe, and the communication part communicates with the second fluid lead-in pipe through the guiding pipe.

Preferably, the guiding pipe is provided with a check valve, and the check valve allows fluid to flow to the second fluid lead-in pipe from the communication part.

Preferably, a flow control valve is arranged on the guiding pipe.

Preferably, the bubble removing system further comprises a final bubble removing device, the final bubble removing device includes a third closed container and an ultrasonic generator; a final fluid inlet and a final fluid outlet are provided on a wall of the third closed container, the ultrasonic generator is arranged on the wall of the third closed container, the final fluid inlet communicates with the first fluid lead-out pipe of the main bubble removing device, and an interior and an exterior of the third closed container communicate with each other through the final fluid outlet.

Preferably, the bubble removing system further comprises a second connection pipe, the final fluid inlet and the final fluid outlet are both provided on a top wall of the third closed container, and the final fluid inlet communicates with the first fluid lead-out pipe through the second connection pipe.

In order to achieve a purpose of the present disclosure, a bubble removing method performed by the above bubble removing system is provided, including:

S1: feeding a fluid substance containing bubbles in a bubble pre-removing device, and preliminarily removing bubbles of the fluid substance by using a helical polymer film pipe of the bubble pre-removing device;

S2: introducing the fluid substance subjected to preliminary bubble removing into a main bubble removing device, to further separate the bubbles in the fluid substance from the fluid substance, introducing a separated fluid substance hardly containing the bubbles into a final bubble removing device, and introducing a fluid substance rich in bubble into the bubble pre-removing device again; and S3: vibrating the fluid substance introduced into the final bubble removing device by using an ultrasonic generator in the final bubble removing device, and breaking the bubbles in the fluid substance in the final bubble removing device.

Preferably, the fluid substance is a colloidal substance.

Preferably, the fluid substance is photoresist.

In the present disclosure, a space in a first closed container is great, lots of the fluid (colloidal) substance can be treated at one time, and bubble removing efficiency can be improved through the bubble removing device. Meanwhile, the main bubble removing device is simple in structure, and thus, the main bubble removing device itself is low in cost. In addition, by means of the bubble removing system, the fluid (colloidal) substance basically containing no bubbles can be efficiently obtained.

BRIEF DESCRIPTION OF THE DRAWINGS

The drawings are used for providing further understanding of the present disclosure, form a part of a description, are used for explaining the present disclosure with following specific embodiments, but are not limitative of the present disclosure. In the drawings.

| Reference signs | |
|---|---|
| 100: bubble pre-removing device | 110: colloidal pre-entering pipe |
| 120: first connection pipe | 130: helical polymer film pipe |
| 200: main bubble removing device | 210: first closed container |
| 220: main colloidal entering pipe | 230: main colloidal outgoing pipe |
| 240: bubble collecting member | 241: bubble collecting part |
| 242: communication part | 241a: base plate |
| 241b: bubble collecting blade | 242a: upper communicating pipe |
| 242b: lower communicating shell | 300: final bubble removing device |
| 310: third closed container | 311: final colloidal inlet |
| 312: final colloidal outlet | 320: ultrasonic generator |
| 400: second closed container | 600: guiding pipe |
| 700: check valve | 800: flow control valve |
| 900: second connection pipe | |

DETAILED DESCRIPTION

The specific embodiments of the present disclosure will be explained in detail in connection with the drawings. What should be understood is that, the specific embodiments described herein are only used for illustrating and explaining the present disclosure and are not used for limiting the present disclosure.

The present disclosure provides a bubble removing system, the bubble removing system is configured for removing bubbles in a colloidal substance, and the bubble removing system at least includes a main bubble removing device.

Figure 1:
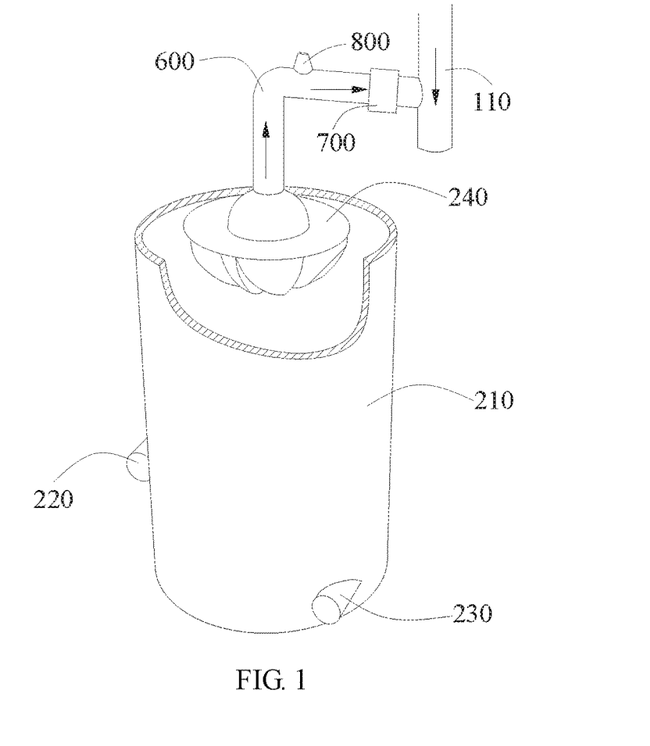
FIG. 1 is a schematic diagram of a main bubble removing device in a bubble removing system provided by the present disclosure, wherein, a top wall and part of a side wall of a first closed container are removed in FIG. 1, to expose a bubble collecting member.

As shown in FIG. 1, the main bubble removing device includes a first closed container 210, a main colloidal entering pipe 220, a main colloidal outgoing pipe 230 and a bubble collecting member 240.

An inner cavity cross section of the first closed contained 210 is round; the first closed container 210 is configured for accommodating the colloidal substance, the main colloidal entering pipe 220 passes through a side wall of the first closed container 210; and the main colloidal entering pipe 220 is tangent with an inner cavity wall of the first closed container 210. The main colloidal outgoing pipe 230 passes through a side wall of the first closed container 210, and a position of the main colloidal entering pipe 220 on the side wall of the first closed container 210 is higher than a position of the main colloidal outgoing pipe 230 on the side wall of the first closed container 210.

Figure 3:
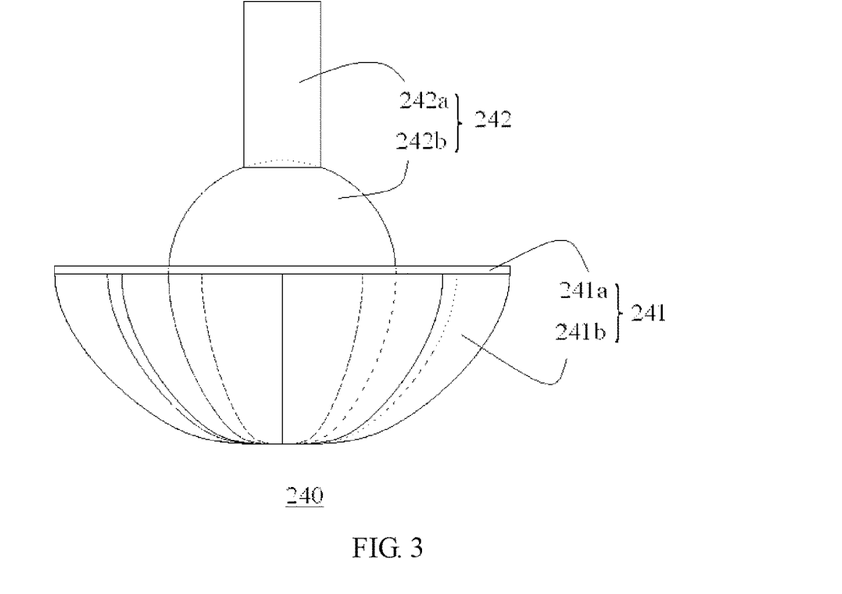
FIG. 3 is a main view schematic diagram of the bubble collecting member of the main bubble removing device as shown in FIG. 1.

Referring to FIG. 3, the bubble collecting member 240 includes a hollow bubble collecting part 241 and a communication part 242, the bubble collecting part 241 is arranged on a top of an inner cavity of the first closed container 210, so as to collect the fluid substance located on a top of the first closed container 210 and rich in bubble. The communication part 242 is arranged outside the first closed container 210, and the communication part 242 communicates with a hollow portion of the bubble collecting part 241.

Because the main colloidal entering pipe 220 is arranged on an upper portion of the side wall of the first closed container 210 and the main colloidal entering pipe 220 is tangent with the first closed container 210, when the colloidal substance is fed to the first closed container through the main colloidal entering pipe 220, the colloidal substance flows rotationally and downwards along the inner wall of the first closed container. As the introduced colloidal substance becomes more and more, the colloidal substance in the first closed container 210 rotates in a specific direction (clockwise or counterclockwise). Under action of centrifugal force, the colloidal substances start to move in a direction away from an axis of an inner cavity of the first closed container 210, so that the colloidal substance can be separated from the bubbles; the bubbles are concentrated on an center portion of the first closed container, along with continuous introducing of the colloidal substance, the colloidal substance rich in bubble is concentrated at a center position of a top of the first closed container 210.

The colloidal substance in the first closed container (includes the colloidal substance rich in bubble and the colloidal substance containing little bubbles) is in a continuous-rotation state, when making contact with the bubble collecting part 241, the colloidal substance rich in bubble can be easily collected by the bubble collecting part located at the center position of the top of the first closed container 210 and can be conveyed to an exterior of the first closed container through the communication part 242, so as to achieve separation of the colloidal substance and the bubbles.

Through the above description, it can be known that the bubble removing device provided by the present disclosure separates the colloidal substance from the bubbles by merely depending on its own gravity of the colloidal substance and the centrifugal force without resort to other means, and therefore cost for removing the bubbles of the colloidal substance is reduced. Besides, a space in the first closed container is great, lots of the fluid (colloidal) substance can be treated at one time, and bubble removing efficiency can be improved through the bubble removing device. In additional, the main bubble removing device is simple in structure, and thus, the main bubble removing device itself is low in cost.

In the present disclosure, a sucking device communicating with the communication part can be provided, and therefore the colloidal substance rich in bubble and collected by the bubble collecting member can be sucked out of the first closed container 210.

In the present disclosure, a specific shape of the first closed container 210 is not specifically limited, as long as that the inner cavity cross section of the first closed container (that is, a cross section perpendicular to an axis of an inner cavity) is round. In a preferred embodiment of the present disclosure, the first closed container 210 is in a shape of a cylinder, and thus, an inner cavity surface of the first closed container 210 is a cylindrical surface.

In order to ensure that the colloidal substance rotates in a same direction in the first closed container 210, preferably, the main colloidal outgoing pipe 230 is also tangent with an inner cavity wall of the first closed container 210.

Further preferably, as shown in FIG. 1, the main colloidal outgoing pipe 230 and the main colloidal entering pipe 220 are respectively located on two sides of the first closed container 210 in a radial direction, and orientations of pipe openings of the main colloidal entering pipe 220 and the main colloidal outgoing pipe 230 are consistent.

Figure 2:
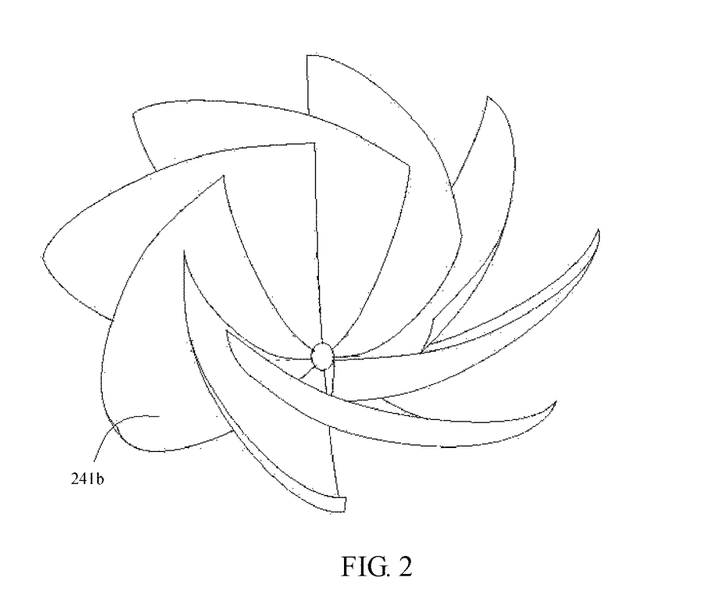
FIG. 2 is a schematic diagram of a part of the bubble collecting member of the main bubble removing device as shown in FIG. 1.

In the present disclosure, a specific structure of the bubble collecting part 241 is not specifically limited, and as long as that the colloidal substance rich in bubble and gathered at the center of the top of the first closed container 210 can be collected. The embodied mode of the bubble collecting part 241 is shown in FIG. 2 and FIG. 3. As shown in FIG. 3, the bubble collecting part 241 includes a base plate 241a and a plurality of bubble collecting blades 241b arranged on a lower surface of the base plate 241a. A surface of the bubble collecting blade 241b is a curved surface. A through hole is formed in the base plate 241a. The plurality of bubble collecting blades 241b surrounds the through hole, and protruding directions of any two adjacent bubble collecting blades 241b are consistent. The communication part 242 is fixed to an upper surface of the base plate 241 and communicates with the through hole.

Because the surface of the bubble collecting blade 241b is a curved surface, when rotating at the center of the top of the first closed container 210, the colloidal substance rich in bubble can be easily collected by the bubble collecting blade 241 b, enters the through hole along the curved surface of the bubble collecting blade 241b and then enters the communication part 242.

An arrangement state of the bubble collecting blade 241b is shown in FIG. 2. It can be seen from FIG. 2 that protruding directions of two adjacent bubble collecting blades 241b are consistent. In two adjacent bubble collecting blades, one bubble collecting blade rotates by a certain angle with respect to the other bubble collecting blade. Therefore the colloidal substance rich in bubble can be conveniently collected.

In the present disclosure, in order to conveniently discharge the colloidal substance rich in bubble out of the first closed container, preferably, the communication part 242 includes an upper communicating pipe 242a and a lower communicating shell 242b. A lower end of the lower communicating shell 242b is fixed to the base plate 241a and covers the through hole. An upper end of the lower communicating shell 242b is connected with the upper communicating pipe 242a, and a cross section of the lower communicating shell 242b gradually decreases in a direction from bottom to top.

Because an opening of the lower end of the lower communicating shell 242b is relative large, the colloidal substance rich in bubble can easily enter the lower communicating shell 242b. Because an opening of the upper end of the lower communicating shell 242b is relative small, the upper communicating pipe 242a with a relatively small diameter can conveniently communicate with the lower communicating shell 242b.

Figure 4:
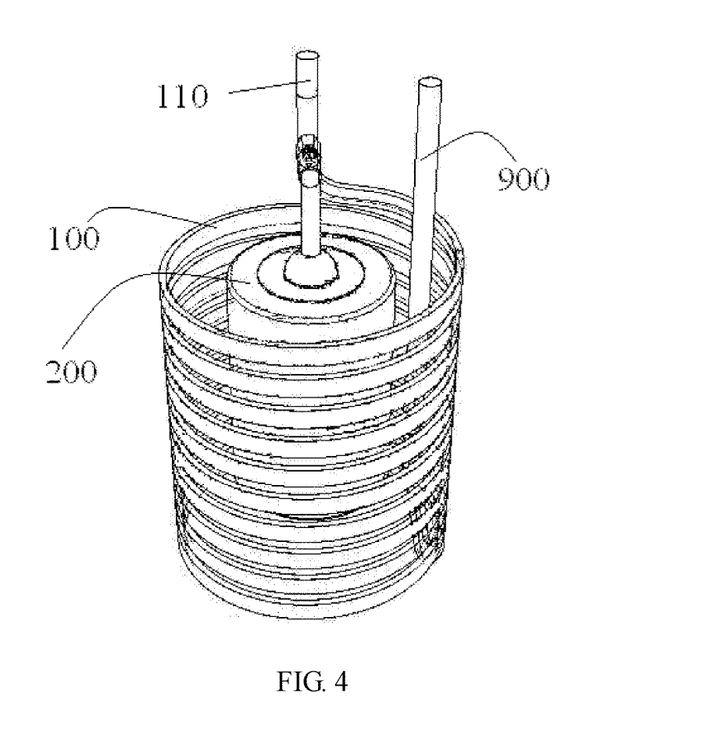
FIG. 4 is a three-dimensional schematic diagram of a part of the bubble removing system provided by the present disclosure.
Figure 5:
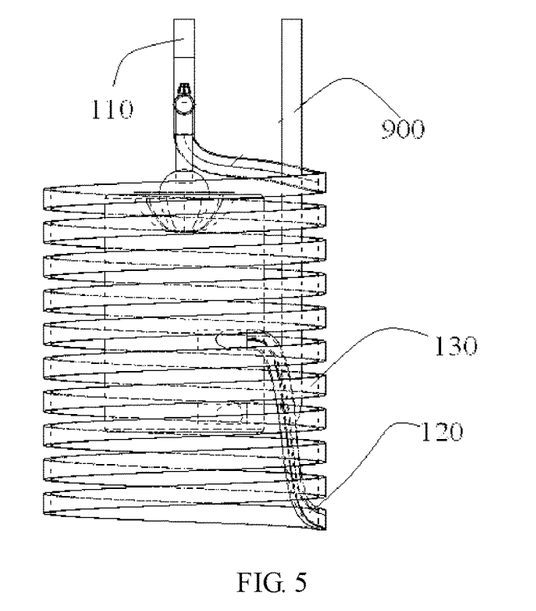
FIG. 5 is a main view of the bubble removing system as shown in FIG. 4.

In order to improve a removing rate of the bubbles in the colloidal substance, preferably, as shown in FIG. 4 and FIG. 5, the bubble removing system can further includes a bubble pre-removing device 100, the bubble pre-removing device 100 includes a helical polymer film pipe 130, an inlet of the helical polymer film pipe is located above an outlet of the helical polymer film pipe, and the outlet of the helical polymer film pipe communicates with the main colloidal entering pipe 220. A side wall of the helical polymer film pipe 130 allows gas to penetrate but does not allow the fluid substance to penetrate.

It is understood that, after the colloidal substance rich in bubble is introduced into the inlet of the helical polymer film pipe 130, the colloidal substance flows downstream along the helical pipeline, because of the centrifugal force, the colloidal substance can move outwards in a radial direction of a helical, and the gas can be gathered on an inner side of the pipeline; because the side wall of the helical polymer film pipe allows gas to penetrate but does not allow the fluid substance to penetrate, when the colloidal substance flows out of the outlet of the helical polymer film pipe, part of the bubbles have been removed.

The colloidal substance passing through the bubble pre-removing device 100 passes through the main bubble removing device 200 again, the bubbles are more thoroughly removed, and the colloidal substance lower in bubble content can be obtained.

Figure 6:
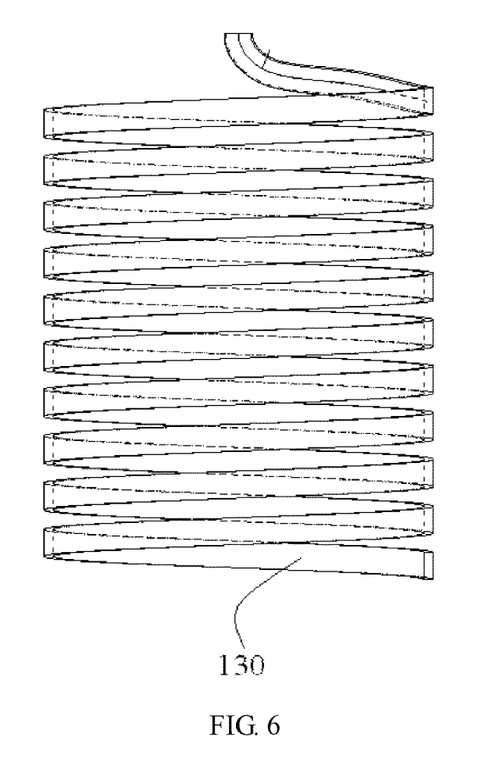
FIG. 6 is a schematic diagram of a helical polymer film pipe in the bubble removing system as shown in FIG. 4.

In order to increase a contact area of the colloidal substance and the helical polymer film pipe, preferably, a cross section of the helical polymer film pipe is rectangular, as shown in FIG. 6.

As a preferred embodiment of the present disclosure, the helical polymer film pipe 130 is arranged to surround the first closed container 210. Only in a case that an outer diameter of the first closed container 210 is smaller than an inner diameter of the helical polymer film pipe 130, the first closed container 210 of the main bubble removing device 200 can be arranged in a space surrounded by the helical polymer film pipe. The smaller a diameter of the first closed container 210 is, the faster an ascending speed of the colloidal substance in the first closed container is, and the faster a rotating speed of the colloidal substance in the closed container is, and therefore the colloidal substance can acquire greater centrifugal force in the main bubble removing device 200, and the bubbles can be separated from the colloidal substance more easily. Except above advantages, a volume of the bubble removing system can also be reduced by arranged the first closed container 210 in the space surrounded by the helical polymer film pipe.

Figure 7:
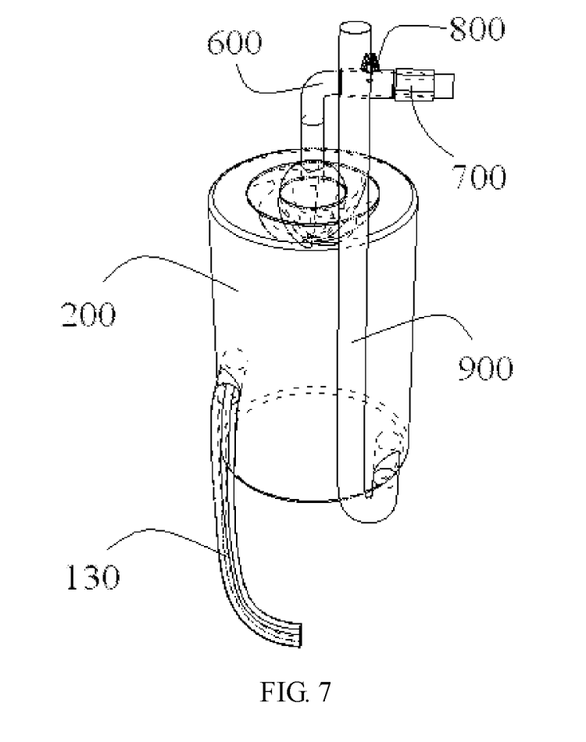
FIG. 7 is a schematic diagram of a combination of the main bubble removing device and a first connection pipe.

In the embodiment provided by the present disclosure, the main colloidal entering pipe 220 of the main bubble removing device 200 is located above the outlet of the helical polymer film pipe 130. Thus, as shown in FIG. 7, the outlet of the helical polymer film pipe 130 can communicate with the main colloidal entering pipe 220 of the main bubble removing device through a first connection pipe 120. In the present disclosure, a material of the first connection pipe is not limited. Preferably, a polymeric film can be utilized for making the first connection pipe 120, and the first connection pipe 120 and the helical polymer film pipe 130 are integrally formed.

Figure 8:
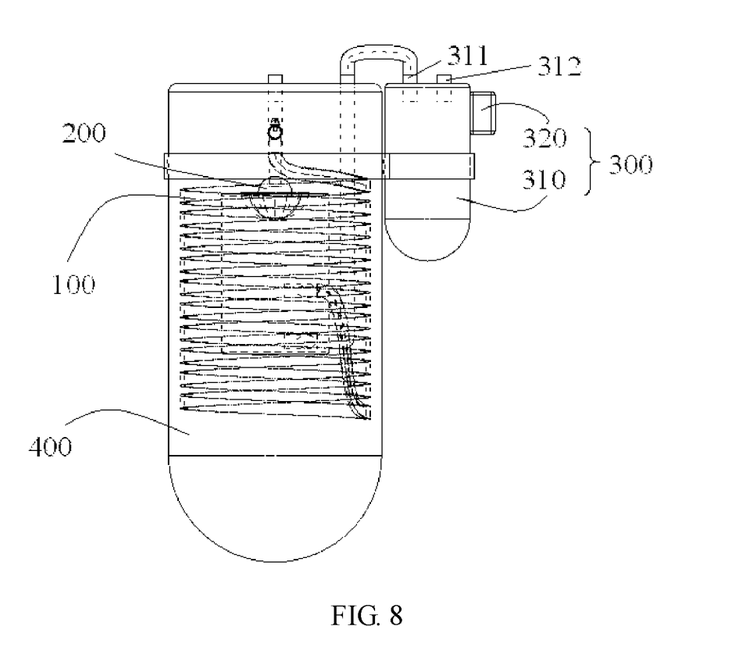
FIG. 8 is a schematic diagram of the bubble removing system provided by the present disclosure.

In order to facilitate transporting and installing, preferably, as shown in FIG. 8, the bubble removing system can also include a second closed container 400 and a colloidal pre-entering pipe 110. The helical polymer film pipe 130 is arranged within the second closed container 400, and the colloidal pre-entering pipe 110 passes through a top wall of the second closed container 400 and communicates with the inlet of the helical polymer film pipe 130.

In order to conveniently discharge the gas out of the helical polymer film pipe 130, preferably, the bubble pre-removing device 100 can further include a vacuumizing mechanism (not shown). The vacuumizing mechanism is configured for vacuumizing the second closed container 400. A pressure difference can be generated between an interior of the helical polymer filth pipe 130 and an exterior of the helical polymer film pipe 130 by means of a vacuumizing machine, the gas can permeate through the wall of the helical polymer film pipe 130 more easily, and therefore a bubble removing effect can be further improved.

As described above, the colloidal substance rich in bubble is separated by the main bubble removing device 200. In order to improve a utilizing rate of the colloidal substance, preferably, the colloidal substance rich in bubble and separated by the main bubble removing device can be subjected to bubble removing. Preferably, the colloidal substance rich in bubble and separated by the main bubble removing device can be guided into the bubble pre-removing device 100. In order to achieve the above purpose, a guiding pipe 600 can be provided between the communication part 242 of the main bubble removing device 200 and the colloidal pre-entering pipe 110 of the bubble pre-removing device 100 for communicating. The colloidal substance rich in bubbles and separated by the main bubble removing device 200 flows into the helical polymer film pipe 130 of the bubble pre-removing device 100 through the guiding pipe 600.

In order to prevent that the colloidal substances rich in bubbles flow back to the first closed container 210 of the main bubble removing device, preferably, a check valve 700 can be arranged on the guiding pipe 600. The check valve 700 only allows fluid to flow to the colloidal pre-entering pipe 110 of the bubble pre-removing device 100 from the communication part 242 of the main bubble removing device. The check valve 700 is arranged to further prevent the colloidal substance introduced into the bubble pre-removing device 100 from flowing into the guiding pipe 600.

Preferably, a flow control valve 800 can also be arranged on the guiding pipe 600, so as to control a flow speed of the colloidal substances flowing through the guiding pipe. The provision of the flow control valve can accordingly avoid sucking the colloidal substance containing little bubbles in the first closed container 210 to an exterior of the first closed container 210 by a too large suction force.

In order to further remove the bubbles in the colloidal substance, preferably, as shown in FIG. 8, the bubble removing system can further includes a final bubble removing device 300. The final bubble removing device 300 includes a third closed container 310 and an ultrasonic generator 320; a final colloidal inlet 311 and a final colloidal outlet 312 are provided on a wall of the third closed container, and the ultrasonic generator 320 is arranged on the wall of the third closed container; the final fluid inlet 311 communicates with the main colloidal outgoing pipe 230 of the main bubble removing device 200. An interior and an exterior of the third closed container 310 communicate with each other through the final fluid outlet 312.

After secondary bubble removing of the main bubble removing device, a content of bubbles in the colloidal substances has already been low, after the colloidal substance low in bubble content enters the final bubble removing device 300. Ultrasonic waves emitted from the ultrasonic generator 320 can penetrate through the third closed container 310 and arrive the colloidal substance. Therefore, the bubbles in the fluid substance can be vibrated to be broken. After being subjected to bubble removing of the final bubble removing device 300, the colloidal substance hardly containing the bubbles can be obtained.

As a preferred embodiment of the present disclosure, the bubble removing system further comprises a second connection pipe 900 (as shown in FIG. 4), the final colloidal inlet and the final colloidal outlet are both provided on the top wall of the third closed container 310, and the final colloidal inlet communicates with the main colloidal outgoing pipe 230 through the second connection pipe 900.

Figure 9:
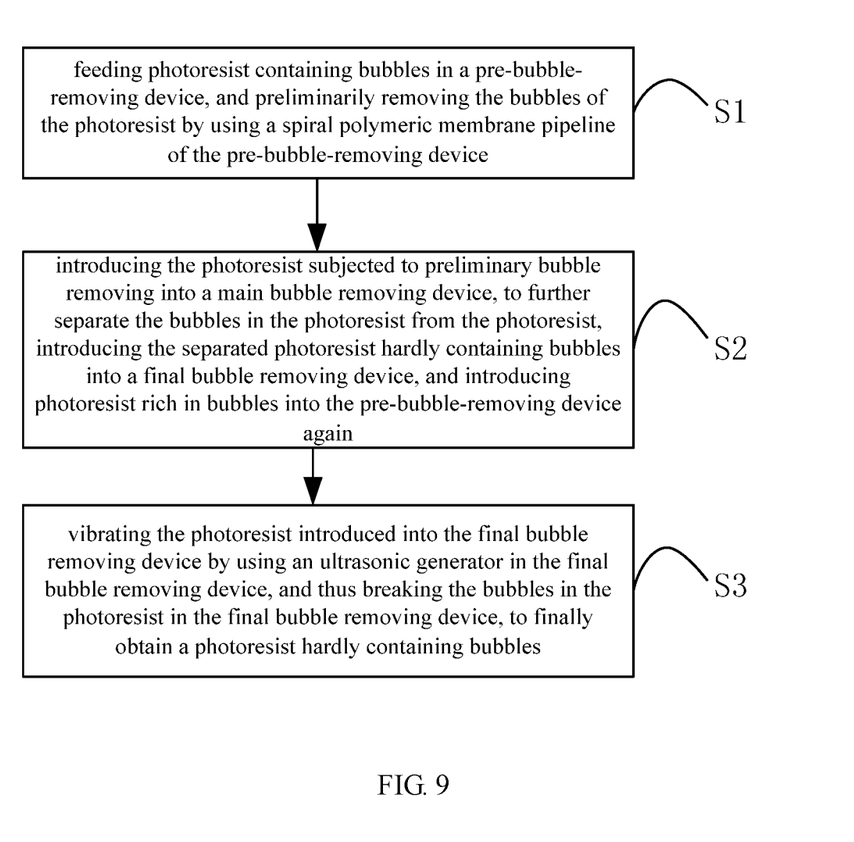
FIG. 9 is a flow diagram performs bubble removing on photoresist by using the bubble removing system provided in FIG. 8.

A specific method for removing bubbles through the bubble removing system as shown in FIG. 8 is introduced hereinafter, as shown in FIG. 9. The bubble removing method includes:

S1: filling photoresist containing bubbles in a bubble pre-removing device, and preliminarily removing the bubbles of the photoresist by using a helical polymer film pipe of the bubble pre-removing device;

S2: introducing the photoresist subjected to preliminary bubble removing into a main bubble removing device, to further separate the bubbles in the photoresist from the photoresist; introducing the separated photoresist hardly containing bubbles into a final bubble removing device, and introducing photoresist rich in bubbles into the bubble pre-removing device again; and S3: vibrating the photoresist introduced into the final bubble removing device by using the ultrasonic generator in the final bubble removing device, and breaking the bubbles in the photoresist in the final bubble removing device, to finally obtain a photoresist hardly containing bubbles.

By using the bubble removing system and the bubble removing method, the fluid (colloidal) substance basically containing no bubbles can be obtained efficiently at low cost.

What can be understood is that, the foregoing embodiments merely are exemplary embodiments of the disclosure in order to illustrate the principle of the embodiment, and not intended to define the scope of the disclosure. Those skilled in the art can make various changes and improvements without departing from the spirit of the disclosure, and all such changes and improvements are within the scope of the claims of the disclosure.

The invention claimed is:

1. A bubble removing system, wherein, the bubble removing system comprises a main bubble removing device, and the main bubble removing device includes a first closed container, a first fluid lead-in pipe, a first fluid lead-out pipe and a bubble collecting member; and an inner cavity cross section of the first closed container is round, and the first closed container is configured for containing a fluid substance; the first fluid lead-in pipe passes through a side wall of the first closed container, is tangent with an inner cavity wall of the first closed container, and is arranged on an upper portion of the first closed container; the first fluid lead-out pipe passes through the side wall of the first closed container and is arranged on a lower portion of the first closed container; the bubble collecting member includes a hollow bubble collecting part and a communication part, the bubble collecting part is arranged in a center of a top of an inner cavity of the first closed container, so as to collect the fluid substance located on the top of the first closed container and rich in bubbles, the communication part is arranged outside the first closed container, and the communication part communicates with a hollow portion of the bubble collecting part, wherein, the bubble removing system further comprises a bubble pre-removing device, the bubble pre-removing device includes a helical polymer film pipe, an inlet of the helical polymer film pipe is located above an outlet of the helical polymer film pipe, the outlet of the helical polymer film pipe communicates with the first fluid lead-in pipe, and a side wall of the helical polymer film pipe allows gas to penetrate but does not allow the fluid substance to penetrate.

2. The bubble removing system according to claim 1, wherein, the first fluid lead-out pipe is tangent with the inner cavity wall of the first closed container.

3. The bubble removing system according to claim 2, wherein, the first fluid lead-out pipe and the first fluid lead-in pipe are respectively located on two sides of the first closed container in a radial direction, and a protruding direction of the first fluid lead-in pipe is consistent with a protruding direction of the first fluid lead-out pipe.

4. The bubble removing system according to claim 1, wherein, the bubble collecting part includes a base plate and a plurality of bubble collecting blades arranged on a lower surface of the base plate, a surface of the bubble collecting blade is a curved surface, a through hole is formed in the base plate, the plurality of bubble collecting blades is arranged around the through hole, protruding directions of any two adjacent bubble collecting blades are consistent, and the communication part is fixed to an upper surface of the base plate and communicates with the through hole.

5. The bubble removing system according to claim 4, wherein, the communication part includes an upper communicating pipe and a lower communicating shell, a lower end of the lower communicating shell is fixed to the base plate and covers the through hole, an upper end of the lower communicating shell is connected with the upper communicating pipe, and a cross section of the lower communicating shell gradually decreases from bottom to top.

6. The bubble removing system according to claim 1, wherein, the fluid substance is a colloidal substance.

7. The bubble removing system according to claim 6, wherein, the fluid substance is photoresist.

8. The bubble removing system according to claim 1, wherein, a cross section of the helical polymer film pipe is rectangular.

9. The bubble removing system according to claim 1, wherein, the helical polymer film pipe is provided to surround the first closed container.

10. The bubble removing system according to claim 9, wherein, the first fluid lead-in pipe is located above the outlet of the helical polymer film pipe, the bubble removing system further comprises a first connection pipe, and the outlet of the helical polymer film pipe communicates with the first fluid lead-in pipe through the first connection pipe.

11. The bubble removing system according to claim 9, wherein, the bubble removing system further comprises a second closed container and a second fluid lead-in pipe, the helical polymer film pipe is arranged in the second closed container, the second fluid lead-in pipe passes through a top wall of the second closed container and communicates with the inlet of the helical polymer film pipe.

12. The bubble removing system according to claim 11, wherein, the bubble removing system further comprises a vacuumizing mechanism, and the vacuumizing mechanism is configured for vacuumizing the second closed container.

13. The bubble removing system according to claim 11, wherein, the bubble removing system further comprises a guiding pipe, and the communication part communicates with the second fluid lead-in pipe through the guiding pipe.

14. The bubble removing system according to claim 13, wherein, the guiding pipe is provided with a check valve, and the check valve allows fluid to flow to the second fluid lead-in pipe from the communication part.

15. The bubble removing system according to claim 13, wherein, a flow control valve is arranged on the guiding pipe.

16. The bubble removing system according to claim 11, wherein, the bubble removing system further comprises a final bubble removing device, the final bubble removing device includes a third closed container and an ultrasonic generator; a final fluid inlet and a final fluid outlet are provided on a wall of the third closed container, the ultrasonic generator is arranged on the wall of the third closed container, the final fluid inlet communicates with the first fluid lead-out pipe of the main bubble removing device, and an interior and an exterior of the third closed container communicate with each other through the final fluid outlet.

17. The bubble removing system according to claim 16, wherein, the bubble removing system further comprises a second connection pipe, the final fluid inlet and the final fluid outlet are both provided on a top wall of the third closed container, and the final fluid inlet communicates with the first fluid lead-out pipe through the second connection pipe.

18. A bubble removing method performed by the bubble removing system according to claim 17, comprising;

feeding a fluid substance containing bubbles in a bubble pre-removing device, and preliminarily removing bubbles of the fluid substance by using a helical polymer film pipe of the bubble pre-removing device;

introducing the fluid substance subjected to preliminary bubble removing into a main bubble removing device, to further separate the bubbles in the fluid substance from the fluid substance, introducing a separated fluid substance hardly containing bubbles into a final bubble removing device, and introducing a fluid substance rich in bubble into the bubble pre-removing device again; and vibrating the fluid substance introduced into the final bubble removing device by using an ultrasonic generator in the final bubble removing device, and breaking the bubbles in the fluid substance in the final bubble removing device.

19. The method according to claim 18, wherein, the fluid substance is a colloidal substance or photoresist.

\* \* \* \* \*